Sept. 24, 1946.    M. LIWSCHITZ    2,408,219
POLYPHASE MULTIPOLAR WINDING
Filed Jan. 29, 1944
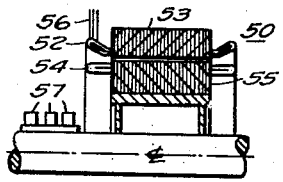
Fig. 1.
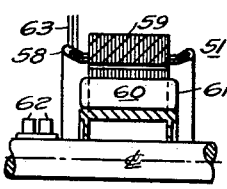
Fig. 2.
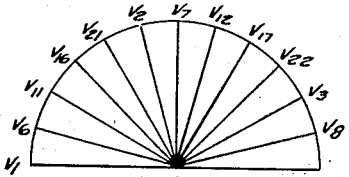
Fig. 3.
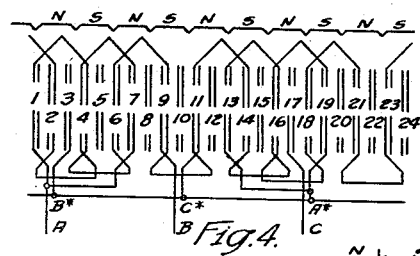
Fig. 4.
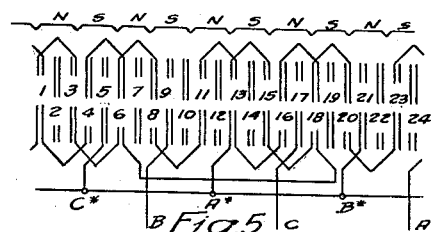
Fig. 5.
Fig. 6.
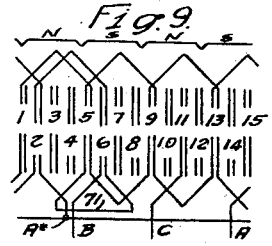
Fig. 9.
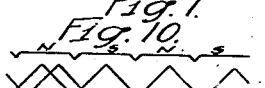
Fig. 7.
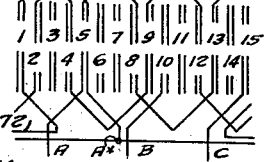
Fig. 10.
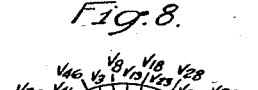
Fig. 8.
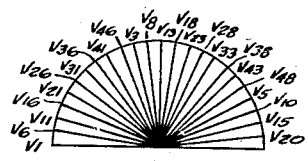
Fig. 11.
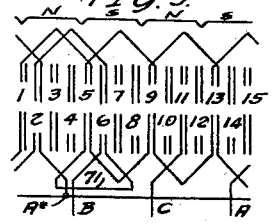
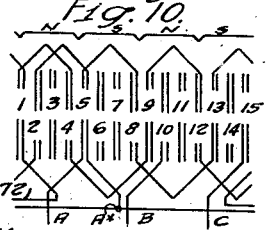
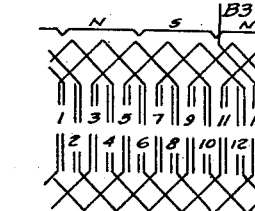
Fig. 12.
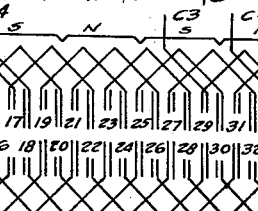
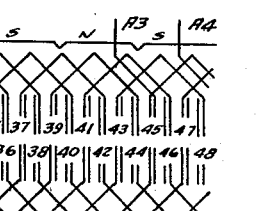
Fig. 13.
Fig. 14.
INVENTOR
Michael Liwschitz.
BY O.D. Buchanan
ATTORNEY Patented Sept. 24, 1946

2,408,219

UNITED STATES PATENT OFFICE 2,408,219

POLYPHASE MULTIPOLAR WINDING

Michael Liwschitz, Brooklyn, N. Y., assignor to Westinghouse Electric Corporation, East Pittsburgh, Pa., a corporation of Pennsylvania Application January 29, 1944, Serial No. 520,233

13 Claims. (Cl. 171—206)

My invention relates to windings, and winding-methods and analysis, for the slotted magnetizable cores of multipolar electrical apparatus; and it has particular relation to polyphase windings, and particularly to fractional-slot wave-windings, although certain broad aspects of my invention are not so limited. By a fractional-slot winding, I mean a winding having a number of slots, $q$, per phase per pole, which is a fraction $q=R/T$ when reduced to its lowest terms; and in contra-distinction from the prior art, I frequently have in mind a fraction, $q$, in which the least denominator, $T$, is greater than 2, although my invention, in some of its broadest aspects, may not be limited to this condition.

While my invention is particularly concerned with modified wave-windings, some features of it are useful in the design and analysis of lap-windings. Wave-windings, or modified wave-windings, are frequently very desirable, because of their fewer end-connections, as distinguished from lap-windings which have connections between each of the successive coils; but wave-windings, or modified wave-windings, are not generally adaptable to a wide choice in the number of slots which must be used, thus frequently necessitating a special slotted core, or a special die, for each different combination of pole and phase-numbers.

Heretofore, in laying out exactly balanced, modified wave-windings for alternating-current machines, the total number of slots of the machine has been an integral multiple of the number of phases times the number of pairs of poles, so that the same integral number of slots lay under each pair of poles. The slots under one pair of poles thus become a repeatable group, or if there is an even number of such slots, the slots lying under a single pole become a repeatable group, these repeatable groups being repeated, around the core of the machine, to make up the entire circumference. In such repeatable groups, the magnetic fluxes, and the induced voltages, of correspondingly positioned coil-sides in all of the groups have the same phases, disregarding 180° phase-shifts which can be taken care of by a reversal of connections.

In polyphase windings, having, say, $m$ phases, it has been possible to produce balanced windings by assigning one $m$th of the coil sides in each repeatable group to each phase; by a balanced winding meaning a winding in which each phase has the same total E. M. F. induced therein, $360/m$ electrical degrees out of phase with each other. The corresponding phases of the several repeatable groups, since their voltages were all equal and in phase with each other, could be connected in parallel, or in series, or in series-parallel, as desired.

In the prior-art balanced wave-windings, however, the number of slots per phase per pole had to be an integer, in case one-pole repeatable groups were utilized, or an integer plus a half, in case two-pole repeatable groups were utilized. This necessitated the choice of a slot-number $s$ equal to $p$ or $p/2$ times the number of slots in each repeatable group, where $p$ is the number of poles, or, for the entire circumference, a total number of slots, $s$, which is a multiple of $pm$ or $pm/2$.

The design or laying-out of windings for dynamo-electric machines, either lap-windings, true wave-windings, or modified wave-windings, has been, in many cases, particularly for fractional-slot windings, a haphazard, rule-of-thumb, experience-dictated, "guess" method. These previous designs have frequently necessitated the use of many pages of charts, and complicated winding-rules, and numerous exceptions and corrections therefor. These previous methods have frequently resulted in windings which are not exactly balanced, although some slightly unbalanced windings have previously been considered to be nearly enough balanced for purposes which have heretofore been considered sufficiently practical. The previously known winding-methods have also frequently resulted in the use of so-called "dead" conductors or coil-sides, or slot-spaces which are not utilized by the winding.

It is an object of my invention to provide a new method for expeditiously and accurately laying out any windings, whether new or old, lap or wave, integral-slot or fractional-slot windings, and for quickly and mathematically accurately analyzing the performance of these windings.

It is a further object of my invention to produce new, heretofore impossible, fractional-slot, modified wave-windings, which design-engineers have not previously known how to lay out, in which the least denominator of the fraction is greater than 2, referring to the fraction representing the number of slots per phase per pole.

A more specific object of my invention is to design a balanced polyphase winding which is based upon a 180° slot-star, which shows the phase relations of the voltages induced in conductors lying in each one of the $mR$ slots of each repeatable group of $T$ poles, (assuming sinusoidal flux-distribution), where $m$ is the number of phases, and $R/T$ is the fraction representing the number of slots per phase per pole, reduced to its lowest terms. In accordance with this aspect of my invention, I show how to quickly calculate the slot-numbers of the successive vectors of the slot-star, and I utilize these successive vectors, in the order in which they appear in the slot-star, in laying out the winding in the correspondingly numbered slots, in a manner which will be described in detail.

With the foregoing and other objects in view, my invention consists in the machines, apparatus, windings, combinations and methods hereinafter described and claimed, and illustrated in the accompanying drawing, wherein:

Fig. 1 is a diagrammatic longitudinal sectional view of the upper half of a wound-rotor induction-motor embodying my invention, Fig. 2 is a similar view of the upper half of a synchronous generator embodying my invention, Fig. 3 is a slot-star vector-diagram to accompany Figs. 4 and 5, Fig. 4 is a developed view of a ten-pole, balanced, three-phase lap-winding having the slot-star of Fig. 3, Fig. 5 is a similar view of a balanced three-phase wave-winding for the same machine, Fig. 6 is a slot-star vector-diagram to accompany Figs. 7, 8, 9 and 10, Fig. 7 is a developed view of a four-pole, balanced, three-phase wave-winding having the slot-star of Fig. 6, Figs. 8, 9 and 10 are similar views of other balanced three-phase wave-windings for the same machine, Fig. 11 is a slot-star vector-diagram to accompany Fig. 12, Fig. 12 is a developed view of a ten-pole, balanced, three-phase wave-winding having the slot-star of Fig. 11, Fig. 13 is a slot-star vector-diagram to accompany Fig. 14, and Fig. 14 is a developed view of a ten-pole, balanced, three-phase wave-winding having the slot-star of Fig. 13.

My invention is applicable to balanced polyphase windings for alternating-current machines, such as the wound-rotor induction-motor 50 of Fig. 1, or the synchronous generator 51 of Fig. 2.

The induction-motor 50 of Fig. 1 has a three-phase primary or stator-winding 52 on a slotted magnetizable stator-core 53, and a three-phase secondary or rotor-winding 54 on a slotted magnetizable rotor-core 55, either or both of which may be designed in accordance with my invention. The three-phase terminals of the stator-winding 52 are the line-conductors 56 of the machine. The three-phase terminals of the rotor-winding 54 are the slip-rings 57 of the machine.

The synchronous generator 51 of Fig. 2 has a three-phase generating or stator-winding 58 on a slotted magnetizable stator-core 59, and a salient-pole exciting or rotor-member 60, having a plurality of direct-current exciting-coils 61 to which exciting current is supplied by the two slip-rings 62 of the machine. The three-phase stator-winding 58 may be designed in accordance with my invention. Its terminals are the three line-conductors 63 of the machine.

In designing and analyzing my windings, I utilize a vector-diagram, designated a slot-star, which shows the relative phases between the magnetic fluxes or the induced voltages V in the several conductors or slot-sides lying in the different slots of the machine, assuming a sinusoidal flux-distribution. In the slot-star, all of the vectors are plotted in two quadrants, or 180 electrical degrees, being reversed, when necessary, to bring this about; the object being to show the relative phases. Reversals can be taken care of by reversals of the electrical winding-connections.

In case the number of vectors V in the slot-star should be less than the total number of slots in which the coil-sides of the winding are placed, it will always be true that the total slot-number will be an exact multiple of the number of slot-star vectors. Thus, the number of slots corresponding to the slot-star vectors constitute a "repeatable group," so that the winding, as a whole, may be divided into a number of repeatable groups of coils, in which correspondingly positioned coil-sides of all of these repeatable groups will have induced voltages represented by the same correspondingly numbered slot-star vectors, so that the entire winding may be analyzed by means of repeatable groups having identical slot-stars.

In analyzing and discussing windings, I shall make use of certain symbols which may conveniently be tabulated as follows:

$p$ = number of poles.
$s$ = number of slots.
$m$ = number of phases.
$q = \dfrac{s}{pm} = \dfrac{R}{T}$ = number of slots per phase per pole, reduced to its lowest terms.
$T$ = number of poles in one repeatable group of winding-coils.
$R$ = number of slots per phase, in each repeatable group of $T$ poles.
$mR$ = number of voltage-vectors in the 180° slot-star of the phase-vectors of each repeatable group.
$\phi_v = \dfrac{180°}{mR}$ = vector-to-vector angle in the slot-star.
$\phi_s = \dfrac{180p}{s} = \dfrac{180°}{mq}$ = slot-to-slot angle in electrical degrees = slot pitch.
$u$ = number of slot-pitches $\phi_s$ between the slots corresponding to any two successive vectors $V_x$ and $V_{(x\ u)}$ of the slot-star.
$k$ = nearest integral approximating the number of pole-pitches between the slots corresponding to two adjacent vectors of the slot-star.
$y_1$ = back pitch, expressed in number of slots.
$y_2$ = front pitch or front-end throw of the winding.
$y = y_1 + y_2$ = double throw or total pitch between successive coils.
$z$ = number of vector-to-vector angles $\phi_v$ of the slot-star, by which the voltage-vector of the first coil-side of one coil leads or lags the voltage-vector of the first coil-side of the preceding coil of a wave-winding.

In any $m$-phase winding, the fraction $q = R/T$, expressing the number of slots per phase per pole, when reduced to its lowest terms, determines the number of slots, $mR$, in each repeatable group of the winding, and hence the number of vectors in the 180° slot-star which shows the relative phases of the voltages induced in the several conductors lying in the slots, assuming sinusoidal flux-distribution. This fraction, $q = R/T$, also determines the number of poles, $T$, spanned by one repeatable group of the winding.

In accordance with my invention, it is a very simple matter for the design-engineer to lay out any balanced polyphase winding, and also to produce new balanced polyphase windings never before achieved, avoiding most of the labor, and all of the guesswork, of previous design-methods.

Every polyphase winding which is capable of being balanced must have an integral number, $p/T$, of repeatable groups, and each repeatable group must have an integral number of groups of $mR$ coil-sides having $mR$ different voltage-vectors which make up the 180° slot-star diagram. Because the number of vectors is a multiple of the phase-number $m$, one $m$th of these vectors will be an integral number ($R$), so that the resultant voltage of each phase may be made up of the vectorial sum of all $R$ vectors assigned to that phase. The $m$ resultant phase-voltages are thus all equal, and, by proper reversals of some of them, they will be $360/m$ electrical degrees out of phase with each other, which is the definition of a balanced condition.

If the slots are numbered consecutively around the core, and if the vectors of the slot-star are numbered to correspond to the slot to which each vector corresponds, it is an important feature of my invention to know the value of the positive or negative integer, $u$, which must be algebraically added to the slot-number, $x$, of any vector, in order to find the slot-number corresponding to the vector having the next larger phase-angle, or the adjacent position in the slot-star.

Heretofore, in windings in which a repeatable group has spanned only a single pole, or 180 electrical degrees (corresponding to an integral slot-number, per phase per pole, or $T=1$), it has been possible to construct a 180° slot-star by dividing 180° by the number of slots, $mR$, and numbering the slots consecutively; and these consecutive numbers have properly corresponded to the successive slots, counted around the portion of the core spanned by one pole-pitch.

If the number of poles, $T$, in the repeatable group is greater than 1, the slot-numbers of adjacent vectors of the slot-star are not consecutive numbers, but it will be necessary to traverse approximately $\pm k$ pole-pitches, from any slot, numbered $x$, before finding the slot, number $(x+u)$, which has the next phase-position in the slot-star, where $\pm k$ is a positive or negative integer, depending on whether the traverse is in the direction of increasing slot-numbers, or in the direction of decreasing slot-numbers.

If the vector-to-vector slot-star angle is $\phi_v = 180°/mR$, the distance, in electrical degrees, between the two slots having $u$ slot-pitches between them, may be written, $$u\phi_s = \phi_v \pm 180k$$

$$u\frac{180}{mq} = \frac{180}{mR} \pm 180k$$

$$u = \frac{q}{R} \pm kmq$$

$$u = \frac{1 \pm kmR}{T} \quad (1)$$

where $\pm k$ is the smallest integer which makes $u$ an integer, either positive or negative, the positive sign indicating that the slot-number $u$ is to be added, in a progressive, or forwardly creeping, winding, and the negative sign indicating that the slot-number $u$ is to be subtracted, in a retrogressive, or backwardly creeping, winding.

In Equation 1, $mR$ represents the number of slots in a repeatable group, or the number of vectors in the 180° slot-star diagram. By substituting, for this number, $mR = sT/p$, Equation 1 may be rewritten $$u = \frac{1}{T} \pm \frac{ks}{p} \quad (1a)$$

It is thus apparent that the vector-to-vector angle $\phi_v$ of the slot-star of a fractional-slot winding is obtained between two slots, say $x$ and $(x \pm u)$, which are spaced by approximately $k$ poles, $kmR/T = ks/p$ slots, or $k$ times 180 electrical degrees, plus or minus a small creepage-distance or angle $\phi_v$ amounting to a $T$th part of one slot-pitch $\phi_s$.

It can be readily shown that Equation 1 cannot be solved or satisfied, unless the number of slots, $T$, in each repeatable group, is prime to all of the integers $k$, $m$ and $R$.

The integer $k$, in Equation 1, is significant. If the integer $k=1$, or other odd number, in Equation 1 or 1a, the successive vectors, $V_1$, $V_{1+u}$, etc., of the slot-star, represent voltages that are induced under poles which are alternately of north and south polarity. If $k=2$, or other even number, the slot-star vectors represent voltages that are induced under poles which are all of the same polarity; or these vectors may be taken to represent the relative phases of the voltages which are induced, say from front to rear, in the conductors lying in the correspondingly numbered slots, if said correspondingly numbered slots are under, say, north poles at the illustrated moment; but if the correspondingly numbered slots are under south poles, the voltages will be induced in the opposite direction, or from rear to front.

In accordance with my invention, the slot-numbers assigned to vectors of the slot-star, by using the sequence 1, $(1+u)$, $(1+2u)$, etc., ($u$ being positive or negative), are used to determine the slot-numbers of the slot-sides which make up a repeatable group of serially connected slot-sides. It is necessary, therefore, to know whether the vector-number assigned to any slot-star vector represents a coil-side under a north pole, or under a south pole, or whether the induced voltage is in the direction from front to rear of the core, or vice versa, when the coil-side is under, say, a north pole. When the number of poles, $T$, spanned by a repeatable group is an odd number, it will be obvious that each vector of the second repeatable group will represent a coil-side of a polarity opposite to that of the correspondingly positioned vector of the first repeatable group.

It is better, therefore, in order to avoid error in windings in which $T$ is odd, to number the slots of the core consecutively through two repeatable groups, from 1 to $2mR$. The slot-star will have only $mR$ vectors $V$, to which are assigned numbers, between 1 and $2mR$. If $u$ is positive, the vector-numbers start with 1, and add $u$ each time, for each successive vector; and if the vector-number becomes more than $2mR$, it is reduced by $2mR$, to keep within that limit. If $u$ is negative, the first vector-number is again 1, the next is $(1+2mR-u)$, the third is obtained by again subtracting $u$, or by adding $(2mR-u)$, and so on, keeping the numbers between the limits of 1 and $2mR$. Each of the $mR$ vectors of the slot-star will then indicate the proper polarity of the correspondingly numbered coil-side, and also the reverse of the proper polarity of a coil-side having a number which is $mR$ more or less than the assigned vector-number.

In windings in which $T$ is even, a second repeatable group, if there is a second repeatable group, will have the same slot-star as the first repeatable group, without the aforesaid reversal of polarity between the two groups; and hence the slots of the core can safely be numbered consecutively from 1 to $mR$, with the numbers assigned to the $mR$ slot-star vectors limited to the limits of 1 and $mR$, by adding or subtracting $mR$ whenever necessary to keep within these limits.

It is to be noted that the total number of poles, $p$, may be equal to $T$, or any multiple of $T$, if $T$ is an even number; otherwise $p$ must be an even multiple of $T$. In a three-phase winding, where $m=3$, $T$ must be prime to 3; and this limitation rules out windings having a pole-number $p=6$, 12, 18, or other multiple of 3, unless, of course, such pole-numbers are obtained with $T=1$, or $T=2$. The condition, $T=1$, represents the case of an integral-slot or non-fractional-slot winding, which is really only a special case of a fractional-slot winding; and my formulas apply, with equal readiness, of course, to this case. The condition, $T=2$, represents a winding in which the number of slots per phase per pole is an integer plus ½, and, of course, my formulas are applicable.

Some such windings, having $T=1$ or $T=2$, have been known before, both in wave and lap-windings, and some fractional-slot lap-windings, having $T$ greater than 2, have been known before. Some of these previously known windings have been perfectly balanced, while others have not been balanced, and some have involved "dead" conductors. In the Italian translation of the third volume of my "Electrical Machines," published in 1937 under the name Liwschitz-Garik, I gave a formula for the slot-difference $u$, and showed how to lay out a balanced lap-winding by using this difference; but I was not able, at that time, to lay out a balanced fractional-slot wave-winding. So far as I know none of these previously known wave-windings has been laid out, or analyzed, by my sure slot-star method, with the characteristic slot-difference $u$ of the slot-star calculated beforehand, by a formula such as my Formula 1.

When the pole-pitch number, $k$, is 2, or other even number, $T$ must be odd, in order to be prime to $k$, and hence the number of poles $p$ must be $2T$, or a multiple thereof. In a 3-phase, fractional-slot winding of this type, $k$ being even, the lowest possible pole-number is $p=10$, corresponding to $T=5$; and other possible pole-numbers of this type include pole-numbers $p=14$, 20, 22, 26, 28, 30, 34, and higher pole-numbers.

In laying out a winding according to one aspect of my invention, I first determine the successive vector-numbers of the slot-star, as previously explained. One $m$th of these numbers, or $R$ numbers, are assigned to each of the $m$ phases. Usually a group of numbers corresponding to $m$ consecutive vectors, or $180/m$ electrical degrees, are chosen for each phase, thereby producing a winding having the highest possible distribution-factor.

In laying out a lap-winding according to this aspect of my invention, I utilize the order of the numbers, in the slot-star, to determine in which slots to place the first coil-sides, or upper conductors (in a double-layer winding), of each phase of the winding. Thus, in a 10-pole, 24-slot, 3-phase lap-winding, having $q=s/pm=R/T=4/5$, Equation 1 shows that $k=2$ and $u=5$, measured forwardly, or added. The first $R$ slot-star vectors, for phase-A, would be numbered, respectively, 1, 6, 11, 16; the second $R$ vectors, for phase-B, would be numbered 21, 2, 7, 12; and the third $R$ vectors, for phase-C, would be numbered 17, 22, 3, 8. Thus, the top-layer conductors for phase-A would be in slots 1, 6, 11 and 16; those of phase-B in 21, 2, 7 and 12; and those of phase-C in 17, 22, 3 and 8.

For phase-B, it is necessary to reverse the polarity, or to add $\pm mR = \pm 12$ to the slot-numbers ($T$ being odd), in order to get a 120° phase-difference between the phases, instead of the 60° phase-difference between the three groups of $R=4$ vectors of the slot-star. Because of the symmetry of the winding, we can simply add one-third of 24, or 8, to the slot-numbers for phase-A, obtaining the numbers 9, 14, 19 and 24 for the top-layer conductors of phase-B. The top-layer conductors of phase-C are the last four vector-numbers of the slot-star of Fig. 3, these numbers being 17, 22, 3 and 8, which are displaced by two-thirds of 24, or 16 slots, from the respective numbers for phase-A.

Because phases B and C are thus always the same as phase-A, only displaced by the proper number of slots, they are not, in general, shown in detail in the various winding-diagrams of the drawing.

This fully determines the layout of the winding. The vector-star is shown in Fig. 3, and phase-A of a ten-pole lap-winding corresponding thereto is shown in Fig. 4, with the terminal-positions of phases B and C indicated. The second coil-sides, or lower-layer conductors, of the respective coils could be displaced 2 slot-pitches from the first coil-sides, for a maximum possible chord-factor of 2/2.4, or .833; or, as shown in Fig. 4, the coil-throw could be 3 slit-pitches, for a chord-factor of $1-[(3-2.4)/2.4]$, or .75.

It will be noted that every slot of a phase-group, corresponding to $R$ consecutive vectors of the slot-star, such as the vectors $V_1$, $V_6$, $V_{11}$ and $V_{16}$ of phase-A, must be occupied by coil-sides of the phase-A winding; but the slots can be taken in any order.

In laying out a wave-winding according to one aspect of my invention, I place the beginnings, or first coil-sides, of two successive coils in slots which are spaced by approximately two poles (or other even number of poles, if longer pitches are to be tolerated), plus or minus a slight creepage-distance which I determine by the corresponding vectors of the slot-star, taken in the order in which they appear in the slot-star, insofar as such order is conveniently possible, thus minimizing the need for end-connectors. The return-conductors, or second coil-sides of the coils, may be chosen for any intermediate slots, spaced by $y_1$ slots from the first coil-sides of the respective coils, according to the chording desired.

The design-engineer, in laying out a wave-winding in accordance with this phase of my invention, first determines the number of phases $m$ (usually 3), and the number of poles $p$, of his winding. He then selects, usually out of available punched cores, or available dies for making them, the slot-number $s$, or the repeatable group-number $mR=sT/p$, which will make $k$ either 1 or 2, in either one of the interchangeable Equations 1 or 1a, according to the type of winding desired, or according to the available cores or dies. The integer $k$ may be larger than 2, if a longer double-throw, $y$, corresponding to 4 or 6 poles, is to be tolerated, as would be the case if $u$ were unity, or other very small number; but in the following explanations, for the sake of simplicity, a double-throw, $y$, of approximately 2 poles will usually be assumed.

According to my invention, therefore, with the double-throw, $y$, equal to approximately 2 poles, $y$ will be exactly equal to either $u$ or $2u$, according as $k$ is equal to 2 or 1, respectively. In the general case, however, $y$ may be equal to any number of $u$'s, or $$y = zu = \frac{zkmR \pm z}{T} = \frac{2mR + mR(zk-2) \pm z}{T} \quad (2)$$

with the limitation that $zk$ must always be an even number, usually 2, corresponding to a double-throw $y=zu$ slots, approximating $zk=2$ pole-pitches, so that $zkmR/T$, or $zks/p$, represents the fractional number of slots in exactly two poles, or 360 electrical degrees, or in a plurality of pairs of poles if longer-pitch windings are to be considered, in which case $zk$ will be a multiple of 2.

Since the integer $z$ represents the number of slot-groups $u$ between the beginnings, or the first coil-sides, of successive coils of the winding, and since $u$ represents an integral number of slot-pitches between coil-sides in which the induced E. M. F.'s are $\pm\phi_v$ out of phase, if $k$ is even, or between coil-sides in which the induced E. M. F.'s are $(180°\pm\phi_v)$ out of phase, if $k$ is odd, it follows, from Equation 2, that $z$ represents the number of vector-to-vector angles, $\phi_v$, of the slot-star, by which the voltage-vector of the first coil-side of one coil leads or lags the voltage-vector of the first coil-side of the preceding coil of the winding, the angle being additive, if the plus sign is used in Equation 1 or 1a, and being subtractive if the minus sign is used.

I shall illustrate the design of wave-windings in accordance with my invention, by considering the case of a wave-winding in which $kz$ is 2, which is to say that the double throw, $y$, in Equation 2, is equal to two pole-pitches, $2mR/T$, plus or minus a small creepage-angle. I shall also confine my illustration of wave-windings to those novel fractional-slot wave-windings in which T is greater than 2, although my invention is also useful in laying out, and analyzing, other wave-windings. There are two types of winding of this class; first the case in which $z=1$ and $k=2$; and second the case in which $z=2$ and $k=1$.

When $z=1$, in Equation 2, in a wave-winding, $k$ will thus have to be equal to 2 (or other even number), in Equation 1; and hence the total pitch, $y$, or the number of slots between the beginnings of successive coils of the wave-winding, will be exactly the same as the slot-difference, $u$, or number of slots between those coil-sides which have the least phase-displacement $\phi_v$ between them, as represented by successive vectors of the slot-star. In this case, the slot-numbers which are assigned to any two consecutive vectors, $V_x$ and $V_{x\pm u}$, of the slot-star are also in general, or as far as possible, the slot-numbers of the first coil-sides of any two consecutive coils of the winding, thus minimizing the required number of group-connections at the ends. At any rate, the slot-difference, $u$, of the slot-star fixes the total pitch, $y$, of the winding.

The $mR$ vectors of the slot-star are subdivided into $m$ groups of $R$ vectors each, one for each of the $m$ phases; and each phase-winding of that repeatable group must have coils having one coil-side, or the same number of coil-sides, in each of the slots having positions numbered correspondingly to the aforesaid R vectors of the slot-star.

Thus, in a balanced, 10-pole, 24-slot, 3 phase wave-winding, having $q=s/pm=R/T=4/5$, Equation 1 shows that $k=2$, and $u=5$, measured forwardly, or added. The first R slot-star vectors, for phase-A, would be numbered, respectively, 1, 6, 11, 16; the second R vectors, for phase-B, would be numbered 21, 2, 7, 12; and the third R vectors, for phase-C, would be numbered 17, 22, 3, 8. Thus, the top-layer conductors for the successive coils of phase-A would be in slots numbered 1, 6, 11 and 16. The slot-star of such a balanced, fractional-slot wave-winding is the same as the one shown in Fig. 3; a development of the winding is shown in Fig. 5.

A winding, such as the fractional-slot wave-winding just described, as exemplified in Fig. 5, may be applied, for example, to the rotor-core 55 of a wound-rotor induction-motor 50, such as is shown diagrammatically in Fig. 1. Since the illustrated winding, as shown in Fig. 5, is assumed to be designed for the secondary winding 54 of an induction-motor 50, it is usually desirable, other considerations permitting, for it to have the highest chording-factor possible, so that I have chosen a rear-end pitch of $y_1=2$, rather than $y_1=3$, so as to obtain a chord-factor of .833 rather than .75. I thus utilize the group of vector-numbers 3, 8, 13 and 18, for the successive return-conductors of the phase-A coils, these vector-numbers being obtained by adding the back pitch, $y_1=2$, to each of the numbers 1, 6, 11 and 16 of the slots occupied by the first coil-sides of the respective coils. Phase-A of the winding is shown in its entirety in Fig. 5.

When $z=2$ and $k=1$, however, a somewhat different type of wave-winding results. Here, the order of succession of the slot-numbers for the first coil-sides of successive coils of each phase of the winding is determined by every alternate vector of the group of R slot-star vectors which are assigned to that phase. This is so, because, in this case, the slot-star vectors, according to Equation 1, represent a condition in which the slots corresponding to succeeding vectors are under alternately north and south poles, with approximately one pole-pitch, or $kmR/T$ slots, between them, $k$ being equal to 1.

Thus, in a 4-pole, 15-slot, 3-phase wave-winding, having $q=s/pm=R/T=5/4$, Equation 1 shows that $k=1$, and $u=4$, which is measured forwardly, or added to the preceding vector-star number, because the plus sign is utilized in the formula expressed by Equation 1. The slot-star vectors will thus have the following numbers, in order: for phase-A, 1, 5, 9, 13 and 2; for phase-B, 6, 10, 14, 3 and 7; and for phase-C, 11, 15, 4, 8 and 12. Such a slot-star is shown in Fig. 6.

A wave-winding corresponding to this slot-star, with successive vectors representing slots under poles of opposite polarities, will have to have a total pitch, $y=2u=8$, such as from slot 1 to slot 9.

If the winding just mentioned has its back and front pitches $y_1=y_2=u=4$, then the second coil-sides of the respective successive coils will lie in the slots corresponding to the slot-star vectors which were skipped by the first coil-sides, and these second coil-sides may be regarded as satisfying the requirement for a phase-A winding-group having one coil-side in each of the slots numbered 1, 5, 9, 13 and 2, for example. Thus, starting at the front, as shown in Fig. 7, the phase-A winding-group of such a (double-layer) wave-winding may be regarded as including the top conductor of slot 1, the bottom conductor of slot 5, top 9, bottom 13, and top 2, to the rear of the core, where connection is made to the star-point phase-A terminal A*, as shown in Fig. 7. A second phase-A winding group, connected in parallel with the first (if the winding is a double-layer winding, as shown), may start at A' at the front, and may successively include the bottom conductor of slot 2, top 13, bottom 9, top 5, and bottom 1, to a phase-A group-connector 70 which is connected to the phase-A star-point terminal A* at the rear. The winding is shown in Fig. 7. Here, the chording-factor is unity.

Alternatively, the second winding-group of each phase, such as phase-A, instead of having its coil-sides occupying the same five slots as the first phase-A winding-group, can occupy slots corresponding to a displaced group of five consecutive vectors in the slot-star, in which case the second phase-A winding-group could not be connected in parallel with the first phase-A winding-group, but would have to be in series with it, as shown in Fig. 8. This introduces a chording-factor according to the phase-displacement between the two phase-A winding-groups.

Thus, in Fig. 8, the first phase-A winding-group is the same as in Fig. 7, but its end is joined, at the rear of the core, to a group-connector 70A, which connects to the second phase-A winding-group, which may be considered as starting at the rear, and including, in order, the top conductor of slot 13, bottom 9, top 5, bottom 1, and top 12, where a star-point connection is made at A*, at the front of the core, as shown in Fig. 8. The phase-displacement between the two winding-groups is one vector-to-vector angle $\phi_v$ of the slot-star, or $u=4$ slots. Since one pole-pitch is $mR/T=15/4$ slots, a 4-slot displacement gives a chord factor of $$1 - \frac{4-3.75}{3.75} = 14/15 = .933$$

The winding is shown in Fig. 8.

It is to be understood, of course, that the two winding-groups of each phase could have been connected in series in Fig. 7, instead of in parallel, by using the same system shown in Fig. 8. In other words, any phase-displacement could be used, in Fig. 8, either zero, or any other available phase-displacement, depending upon the chording desired.

A still further alternative winding-connection of the four-pole machine just discussed is represented by the case in which all five slot-numbers assigned to each phase are occupied, in order, by the top-conductors, or by the bottom-conductors, of the slots in question. Thus, the top coil-sides of the successive coils of phase-A may be in slots 1, 5, 9, 13 and 2, in the order named. The bottom coil-sides of each coil may be displaced, by any pitch $y_1$, from the top-coil side of that coil.

Thus, in Fig. 9, in back pitch $y_1$ is 4, and the bottom coil-sides lie respectively in slots 5, 13, 6, 9 and 2, which are displaced by an angle $\theta_v$, or $u=4$ slots, from the group of top coil-sides which are in slots 1, 9, 2, 5 and 13, taking alternate vectors of the slot-star, in order to obtain a double throw, $y$, approximating two poles. This gives a chord-factor of $$1 - \frac{4-3.75}{3.75} = 14/15 = .933$$

Fig. 9 shows, in detail, only the phase-A winding-group of ten coil-sides, which may be traced through top 1, bottom 5, top 9, bottom 13, top 2 and bottom 6, for the first three coils, then a front-end group-connector 71 joins to top 5, from which the winding progresses, through bottom 9, top 13 and bottom 2, to the front-end star-point terminal A*.

Other chording can be utilized, and also the phase-A winding can be opened at any desired point, to obtain the beginning and the ending of that winding-group. Both of these variations are illustrated in Fig. 10, where a rear-end pitch of $y_1=3$ is utilized, and the winding is opened between the first three coils and the last two coils, in place of the group-connector 71 of Fig. 9. Thus, in Fig. 10, the phase-A winding-group starts with top 5, then proceeds to bottom 8, top 13 and bottom 1, to a front-end group-connector 72, from which the phase-A winding-group continues through top 1, bottom 4, top 9, bottom 12, top 2, and bottom 5, to the star-point terminal A* at the front end of the core.

The phase-A top coil-sides in Fig. 10 thus occupy slots corresponding to the group of $R=5$ adjacent vectors 1, 5, 9, 13 and 2 of the slot-star, while the bottom coil-sides occupy slots corresponding to another, or dephased, group of $R=5$ adjacent vectors 4, 8, 12, 1 and 5 of the slot-star. The phase-displacement between these two groups of five consecutive vectors is thus $3\theta_v$, giving a chord-factor of $$(mR-3)/mR = 12/15 = 4/5 = .8$$

because there are $mR=15$ vector-angles $\theta_v$ in 180 electrical degrees.

In case of a chorded wave-winding in which the number, $R$, of slots, or vectors, per phase, in each repeatable group, is an even number, and in which $k=1$, $y=2$, and $y_1=y_2=u$, it is possible to partially string together the two dephased groups of $R$ coil-sides which make up the winding-group of any phase. Since $R$ is even, $T$ must be odd, since it must be prime thereto, and hence the pole-number $p$ must be $2T$, or a multiple of $2T$.

This is illustrated in the vector-star of Fig. 11, and the complete winding of Fig. 12, for a simple case in which the approximate number of pole-pitches between adjacent vectors of the slot-star is $k=1$, the number of poles in each repeatable group is $T=5$, the pole-number is $p=10$, the phase-number is $m=3$, the number of slots per phase per repeatable group is $R=8$, the total number of slots in each repeatable group is $mR=24$, and the total number of slots for the entire winding is $s=mRp/T=48$. Equation 1 shows that the slot-difference between successive vectors of the slot-star is $u=5$, measured progressively. The slot-star is characterized, therefore, by vectors corresponding to the following slot-numbers, in the order named:

For phase-A, 1, 6, 11, 16, 21, 26, 31, 36.
For phase-B, 41, 46, 3, 8, 13, 18, 23, 28.
For phase-C, 33, 38, 43, 48, 5, 10, 15, 20.

I am illustrating, in Fig. 12, a ten-pole, 48-slot wave-winding in which the back and front pitches are equal to one pole-pitch of $mR/T=24/5$ slots, plus one vector-angle $\theta_v=1/T$ slot, or $$y_1=y_2=u=5$$

Therefore, the total pitch is $y=y_1+y_2=2u=10$. The winding is assumed to be a two-layer winding, and hence, as in Fig. 8, it will have two winding-groups per phase per repeatable group, these winding-groups being connected in series with each other to form the phase-A winding of that repeatable group. Each winding-group has $R=8$ coil-sides, or 4 coils, with the successive coil-sides occupying slots numbered corresponding to the vectors in one $m$th of the vector-star diagram, or a group of $R=8$ successive vectors of the slot-star, Fig. 11. If there is to be chording, or phase-displacement, between these two serially connected winding-groups of each of the two repeatable groups, a part of the second phase-A winding-group of each repeatable group may be attached to either the beginning or the end of the first phase-A winding-group of the same repeatable group, without a group-connector at that point.

Fig. 12 illustrates such a winding, in which there is a phase-displacement of four vector-angles, or $4\phi v$, between the two groups of $R=8$ consecutive vectors in the slot-star of Fig. 11, giving a chording-factor of $$(mR-4)/mR=(24-4)/24=5/6=.833$$

The first winding-group of phase-A starts with the winding-terminal A1 at the front end of the core, and it has its $R=8$ coil-sides alternately in the tops and bottoms of slots 1, 6, 11, 16, 21, 26, 31 and 36. The second winding-group of the same phase is displaced by four vectors of the slot-star, so that the second group of phase-A slots has the vector-numbers, 21, 26, 31, 36, 41, 46, 3 and 8.

In Fig. 12, the last four slot-numbers of the second group follow right on after the vector for the 8th slot of the first group. Thus, from the end of the first group, the winding continues right on, from the bottom of slot 36, previously mentioned, to the top of slot 41, which is the 5th slot-vector-number in the second group of 8 vectors of the slot-star. The phase-A winding then continues, from top 41, to bottom 46, top 3 and bottom 8, to a group-connector 73A at the front of the core. This group-connector then makes connection to the bottom conductor in the 4th slot of the second phase-A winding-group in the other repeatable group of $mR=24$ slots, which is slot $(36-24)=12$, and the phase-A winding then follows backwardly through the rest of the numbers of the second group, (with 24-slot displacement), including the top conductor in slot 7, bottom 2 and top 45, to a second phase-A winding-terminal A2 at the front of the core.

The winding-direction in these four last-mentioned slots is backward because said slots are in the second winding-group, and are under poles of a polarity opposite to that of the correspondingly numbered slots of the first winding-group, the polarity being opposite because each repeatable group spans an odd number of poles, $T=5$. Thus, if the first coil-sides of the coils are in various phase-positions under north poles, at any given moment, the second coil-sides of the same coils should, of course, be in various phase-positions under south poles.

In like manner, the phase-B coil-side slot-numbers are found by adding 16 to the numbers just given for phase-A, while the phase-C numbers are found by adding 32 to the phase-A numbers. Thus, a phase-B winding extends from a winding-terminal B1 at the front of the core, to the top conductor 17, bottom 22, and so on, to the top conductor 13, and thence to the second phase-B winding-terminal B2 at the front of the core. A phase-C winding extends from a winding-terminal C1 at the front of the core, to the top conductor 33, and it ends with the top conductor 29, which is connected to the second phase-C winding-terminal C2.

The three windings thus far traced, for this machine, are shown in full in Fig. 12. It will be seen that every odd-numbered slot carries only its top conductor, and every even-numbered slot carries only its bottom conductor. There is obviously room for a second winding in each phase. If the two windings of each phase are to be connected in parallel with each other, they will have to be exactly in phase, and will have to have alternately bottom and top coil-sides, instead of top and bottom, occupying the same slots as the parallel-connected winding of the same phase. This will provide six more winding-terminals A3, A4, B3, B4, C3 and C4, all at the rear of the core, as shown in Fig. 12.

The foregoing illustrations have all involved forwardly creeping or progressive windings, in which the plus sign was used in Equation 1. It is quite possible, of course, for the minus sign to be used in this equation, in which case the slot-difference, $u$, is to be subtracted from the slot-number of any vector to find the slot-number of the following vector in the star.

Fig. 13 shows such a slot-star, for a three-phase winding having $R/T=7/4$ slots per phase per repeatable group, for which Equation 1 shows that $k=1$, and $u=5$, added retrogressively. Thus, the slot-star has $mR=21$ vectors, numbered as follows:

For phase-A, 1, 17, 12, 7, 2, 18, 13.
For phase-B, 8, 3, 19, 14, 9, 4, 20.
For phase-C, 15, 10, 5, 21, 16, 11, 6.

Fig. 14 shows phase-A of a four-pole wave-winding having a slot-star as shown in Fig. 13, and having two parallel-connectable full-pitch winding-groups in each phase.

It will be understood that the foregoing examples are merely illustrative of my new winding-principles, using the vector-star, and the slot-number sequences in the vector-star, to assist in laying out, and analyzing, balanced polyphase windings, particularly the difficult case of fractional-slot multipolar windings which are exactly balanced.

My invention is particularly applicable to novel, balanced, fractional-slot wave-windings, in which the pole-pitch, expressed in slots, is $mq=mR/T$, where the least denominator, $T$, is greater than 2 and prime to the phase-number $m$. In three-phase windings, this means a least denominator $T$ greater than 3, which means a pole-number $p$, at least equal to 4, if $T$ is even, and a pole-number, $p$, at least equal to $2T=10$, if $T$ is odd. Such balanced polyphase multipolar wave-windings, with $T$ greater than 2, have not been known heretofore.

An essential feature of my invention is the calculation of the slot-difference, $u$, between any two successive vectors $V_x$ and $V_{x\pm u}$ of the slot-star; and the use of one $m$th of the slot-star vectors, or 60°, in a three-phase winding, to determine the slot-numbers of the coil-sides of any given phase-group of the winding; or the use of either $u$ or $2u$ to determine the total pitch $y$ of a wave-winding, according as $u$ approximates two pole-pitches $2mR/T$, or one pole-pitch $mR/T$, respectively.

I claim as my invention:

1. A multipolar electrical apparatus having a magnetizable core having equally spaced slots, and a balanced polyphase wave-winding having coil-sides lying in said slots, characterized by said core having a number of slots per phase per pole that is represented by a fraction which, when reduced to its lowest terms, has a denominator greater than 2, said denominator representing the number of poles in a repeatable group of slots, and the numerator of said fraction representing the number of slots per phase in each repeatable group, the 180° slot-star of the voltage-vectors of the voltages induced in the coil-sides lying in the slots of each repeatable group being divided into as many groups of consecutive vectors as there are phases, and each phase of the winding in each repeatable group including one or more sub-groups composed of coils which follow each other around the core in the same order followed by the corresponding vectors in the portion of the slot-star assigned to said phase.

2. A multipolar electrical apparatus having a magnetizable core having equally spaced slots, and a balanced polyphase wave-winding having coil-sides lying in said slots, characterized by said core having a number of slots per phase per pole that is represented by a fraction which, when reduced to its lowest terms, has a denominator greater than 2, said denominator representing the number of poles in a repeatable group of slots, and the numerator of said fraction representing the number of slots per phase in each repeatable group, the 180° slot-star of the voltage-vectors of the voltages induced in the coil-sides lying in the slots of each repeatable group being divided into as many groups of consecutive vectors as there are phases, and each phase of the winding in each repeatable group including one or more sub-groups composed of coil-sides which follow each other around the core in the same order followed by the corresponding vectors in the portion of the slot-star assigned to said phase.

3. A multipolar electrical apparatus having a magnetizable core having equally spaced slots, and a balanced polyphase wave-winding having coil-sides lying in said slots, characterized by said winding having a total pitch of $y=(1\pm kmR)/T$, if $k=2$, and $y=(2\pm 2kmR)/T$, if $k=1$, where $m$ is the number of phases, and $R/T$ is the number of slots per phase per pole, $T$ being greater than 2 and prime to all of the integers $k$, $m$ and $R$, each phase of the winding having one or other integral number of phase-groups, each phase-group being composed of one or other integral number of coil-sides in each of R slots which are spaced $u$ slots apart, or $mR$ or a multiple of $mR$ slots therefrom, where $u$ is a positive or negative integer equal to $u=(1\pm kmR)/T$.

4. A multipolar electrical apparatus having a magnetizable core having equally saced slots, and a balanced polyphase wave-winding having coil-sides lying in said slots, characterized by said winding having a total pitch of $y=(z\pm zkmR)/T$, where $zk$ is an even number, $k$ is the smallest number that will make $u$ a positive or negative integer in the expression $u=(1\pm kmR)/T$, $m$ is the number of phases, and $R/T$ is the number of slots per phase per pole, $T$ being greater than 2 and prime to all of the integers $k$, $m$ and $R$, each phase of the winding having one or other integral number of phase-groups, each phase-group being composed of one or other integral number of coil-sides in each of R slots which are spaced $u$ slots apart, or $mR$ or a multiple of $mR$ slots therefrom.

5. A multipolar electrical apparatus having a magnetizable core having equally spaced slots, and a balanced polyphase wave-winding having at least two coil-sides in each of said slots of the core, characterized by said winding having a total pitch of $y=(1\pm 2mR)/T$, where $m$ is the number of phases, and $R/T$ is the number of slots per phase per pole, $T$ being greater than 2 and prime to all of the integers 2, $m$ and $R$, the number of poles of the winding being 2T or a multiple of 2T, each phase of the winding having one or other integral number of phase-groups, each phase-group being composed of R coils having any desired coil-throw, said R coils having their first coil-sides spaced $y$ slots apart, or $mR$ or a multiple of $mR$ slots therefrom.

6. A multipolar electrical apparatus having a magnetizable core having equally spaced slots, and a balanced polyphase wave-winding having coil-sides lying in said slots, characterized by said winding having a total pitch of $y=(2\pm 2mR)/T$, where $m$ is the number of phases, and $R/T$ is the number of slots per phase per pole, $T$ being greater than 2 and prime to both $m$ and $R$, the coils of said winding having front and back pitches both equal to one-half of the total pitch $y$.

7. A multipolar electrical apparatus having a magnetizable core having equally spaced slots, and a balanced polyphase wave-winding having coil-sides lying in said slots, characterized by said winding having a total pitch of $y=(2\pm 2mR)/T$, where $m$ is the number of phases, and $R/T$ is the number of slots per phase per pole, $T$ being greater than 2 and prime to both $m$ and $R$, the winding having $2mR$ coil-sides or a multiple thereof, each phase of the winding having a pair of serially connected phase-groups having any desired chording-factor therebetween, or any number of such pairs, each phase-group being composed of R coil-sides spaced $y/2$ slots apart, or $mR$ or a multiple of $mR$ slots therefrom, the coils of said winding having front and back pitches both equal to one-half of the total pitch $y$.

8. A multipolar electrical apparatus having a magnetizable core having equally spaced slots, and a balanced polyphase wave-winding having coil-sides lying in said slots, characterized by said winding having a total pitch of $y=(2\pm 2mR)/T$, where $m$ is the number of phases, and $R/T$ is the number of slots per phase per pole, $T$ being greater than 2 and prime to both $m$ and $R$, each phase of the winding having one or other integral number of phase-groups, each phase-group being composed of R coils having any desired coil-throw, said R coils having their first coil-sides spaced $y$ slots apart, or $mR$ or a multiple of $mR$ slots therefrom.

9. A multipolar electrical apparatus having a magnetizable core having equally spaced slots, and a balanced polyphase wave-winding having coil-sides lying in said slots, characterized by said winding having a total pitch of $y=(2\pm 2mR)/T$, where $m$ is the number of phases, and $R/T$ is the number of slots per phase per pole, $T$ being greater than 2 and prime to both $m$ and $R$, $R$ being an even number and $T$ being an odd number, the number of poles of the winding being 2T or a multiple of 2T, each phase of the winding having a pair of serially connected phase-groups out of phase with each other, or any number of such pairs, the first phase-group of each of said pairs being composed of R coil-sides spaced $y/2$ slots apart, a portion of the second phase-group of each pair continuing from one end of the first phase-group of said pair, in one or more coil-sides occupying slots continuing the aforesaid $y/2$ spacing, the remaining portion of said second phase-group starting with a coil-side spaced $mR$ slots, or a multiple thereof, $\pm y/2$ slots from the slot of the second phase-group which adjoins the aforesaid end of the first phase-group, the remaining coil-sides of said second phase-group continuing on backwardly with a spacing of $-y/2$ between the slots of successive coil-sides.

10. A multipolar electrical apparatus having a magnetizable core having equally spaced slots, and a balanced polyphase wave-winding having coil-sides lying in said slots, characterized by said winding having a total pitch of $$y=(z\pm zkmR)/T$$

where $zk$ is an even number, $k$ is the smallest number that will make $u$ a positive or negative integer in the expression $u=(1\pm kmR)/T$, $m$ is the number of phases, and $R/T$ is the number of slots per phase per pole, T being greater than 2 and prime to both $m$ and $R$, the coils of said winding having front and back pitches both equal to one-half of the total pitch $y$.

11. A multipolar electrical apparatus having a magnetizable core having equally spaced slots, and a balanced polyphase wave-winding having coil-sides lying in said slots, characterized by said winding having a total pitch of $y=(z\pm zkmR)/T$, where $zk$ is an even number, $k$ is the smallest number that will make $u$ a positive or negative integer in the expression $u=(1\pm kmR)/T$, $m$ is the number of phases, and $R/T$ is the number of slots per phase per pole, T being greater than 2 and prime to both $m$ and $R$, the winding having $2mR$ coil-sides or a multiple thereof, each phase of the winding having a pair of serially connected phase-groups having any desired chording-factor therebetween, or any number of such pairs, each phase-group being composed of R coil-sides spaced $y/2$ slots apart, or $mR$ or a multiple of $mR$ slots therefrom, the coils of said winding having front and back pitches both equal to one-half of the total pitch $y$.

12. A multipolar electrical apparatus having a magnetizable core having equally spaced slots, and a balanced polyphase wave-winding having coil-sides lying in said slots, characterized by said winding having a total pitch of $y=(z\pm zkmR)/T$, where $zk$ is an even number, $k$ is the smallest number that will make $u$ a positive or negative integer in the expression $u=(1\pm kmR)/T$, $m$ is the number of phases, and $R/T$ is the number of slots per phase per pole, T being greater than 2 and prime to both $m$ and $R$, each phase of the winding having one or other integral number of phase-groups, each phase-group being composed of R coils having any desired coil-throw, said R coils having their first coil-sides spaced $y$ slots apart, or $mR$ or a multiple of $mR$ slots therefrom.

13. A multipolar electrical apparatus having a magnetizable core having equally spaced slots, and a balanced polyphase wave-winding having coil-sides lying in said slots, characterized by said winding having a total pitch of $y=(z\pm zkmR)/T$, where $zk$ is an even number, $k$ is the smallest number that will make $u$ a positive or negative integer in the expression $u=(1\pm kmR)/T$, $m$ is the number of phases, and $R/T$ is the number of slots per phase per pole, T being greater than 2 and prime to both $m$ and $R$, R being an even number and T being an odd number, the number of poles of the winding being 2T or a multiple of 2T, each phase of the winding having a pair of serially connected phase-groups out of phase with each other, or any number of such pairs, the first phase-group of each of said pairs being composed of R coil-sides spaced $y/2$ slots apart, a portion of the second phase-group of each pair continuing from one end of the first phase-group of said pair, in one or more coil-sides occupying slots continuing the aforesaid $y/2$ spacing, the remaining portion of said second phase-group starting with a coil-side spaced $mR$ slots, or a multiple thereof, $\pm y/2$ slots from the slot of the second phase-group which adjoins the aforesaid end of the first phase-group, the remaining coil-sides of said second phase-group continuing on backwardly with a spacing of $-y/2$ between the slots of successive coil-sides.

MICHAEL LIWSCHITZ.